(12) United States Patent  (10) Patent No.: US 12,073,722 B2
Baba et al.  (45) Date of Patent: Aug. 27, 2024

(54) PARKING LOT IDENTIFICATION SYSTEM AND METHOD

(71) Applicant: DENSO CORPORATION, Kariya (JP)

(72) Inventors: Atsushi Baba, Kariya (JP); Yasuhiko Mukai, Kariya (JP); Kyoichi Sugahara, Kariya (JP); Satoshi Horihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 18/160,978

(22) Filed: Jan. 27, 2023

(65) Prior Publication Data

US 2023/0169861 A1 Jun. 1, 2023

Related U.S. Application Data

(63) Continuation of application No. PCT/JP2021/021254, filed on Jun. 3, 2021.

(30) Foreign Application Priority Data

Jul. 28, 2020 (JP) .................. 2020-127449

(51) Int. Cl.
*B60Q 1/48* (2006.01)
*B60W 30/06* (2006.01)
(Continued)

(52) U.S. Cl.
CPC .............. *G08G 1/14* (2013.01); *B60W 30/06* (2013.01); *B60W 30/146* (2013.01);
(Continued)

(58) Field of Classification Search
CPC ........ G08G 1/14; G08G 1/056; G08G 1/0112; G08G 1/0129; G08G 1/04; G08G 1/146;
(Continued)

(56) References Cited

U.S. PATENT DOCUMENTS 10,043,388 B1\* 8/2018 Kahn ................ G06Q 50/40
2014/0213176 A1\* 7/2014 Mendelson ........... G08C 17/02
455/39

(Continued)

FOREIGN PATENT DOCUMENTS

| JP | 2018-181024 A | 11/2018 |
| JP | 2020-067704 A | 4/2020 |
| WO | 2019/065328 A1 | 4/2019 |

*Primary Examiner* — Toan N Pham
(74) *Attorney, Agent, or Firm* — MASCHOFF BRENNAN

(57) ABSTRACT

A parking lot identification system includes a control apparatus mounted to each of a plurality of vehicles and a central apparatus that communicates with the control apparatus of each of the plurality of vehicles. In the control apparatus of each of the plurality of vehicles, a parking determination unit is configured to determine whether a parking action of the vehicle is recognized, a parking-related data acquisition unit is configured to, in response to the parking action of the vehicle being recognized, acquire parking-related data including data of a location and an orientation of the vehicle during the parking action, and a parking-related data transmission unit is configured to transmit the parking-related data to the central apparatus. The central apparatus is configured to identify a parking lot area based on the parking-related data transmitted from the plurality of vehicles.

22 Claims, 16 Drawing Sheets

(51) Int. Cl.
  *B60W 30/14*     (2006.01)
  *B60W 40/105*    (2012.01)
  *G06V 20/58*     (2022.01)
  *G08G 1/14*      (2006.01)

(52) U.S. Cl.
  CPC ......... *B60W 40/105* (2013.01); *G06V 20/586* (2022.01); *B60W 2420/403* (2013.01); *B60W 2556/40* (2020.02); *B60W 2556/45* (2020.02)

(58) Field of Classification Search
  CPC .... G08G 1/147; B60W 30/06; B60W 30/146; B60W 40/105; B60W 2420/403; B60W 2556/40; B60W 2556/45; G06V 20/586; G01C 21/26
  See application file for complete search history.

(56) References Cited

U.S. PATENT DOCUMENTS

2021/0269020 A1    9/2021  Kubo
2023/0400322 A1*  12/2023  Nakagawa ............. G01C 21/34

* cited by examiner

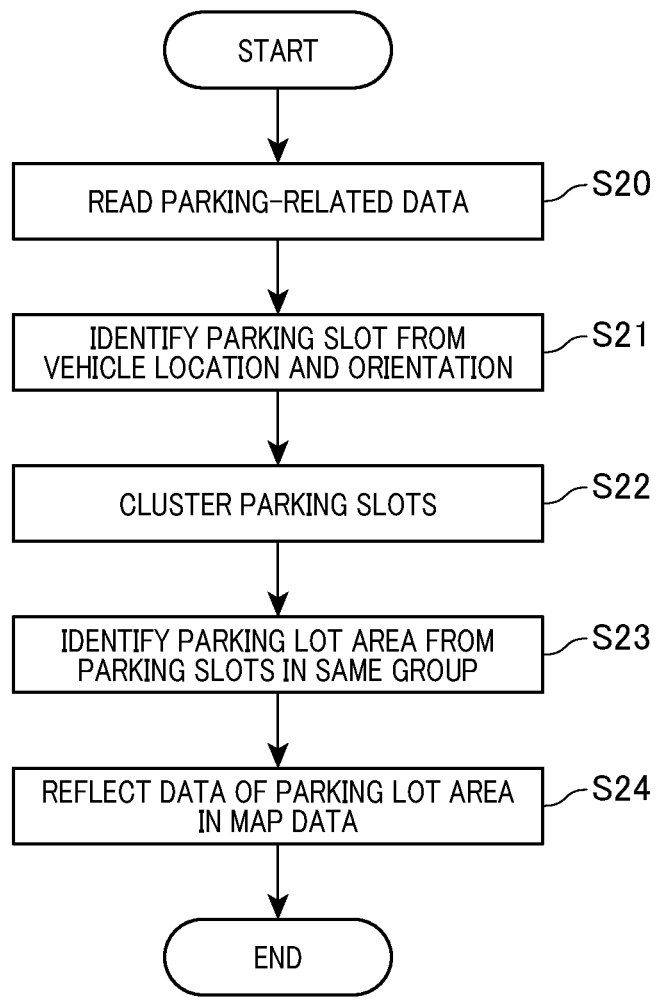

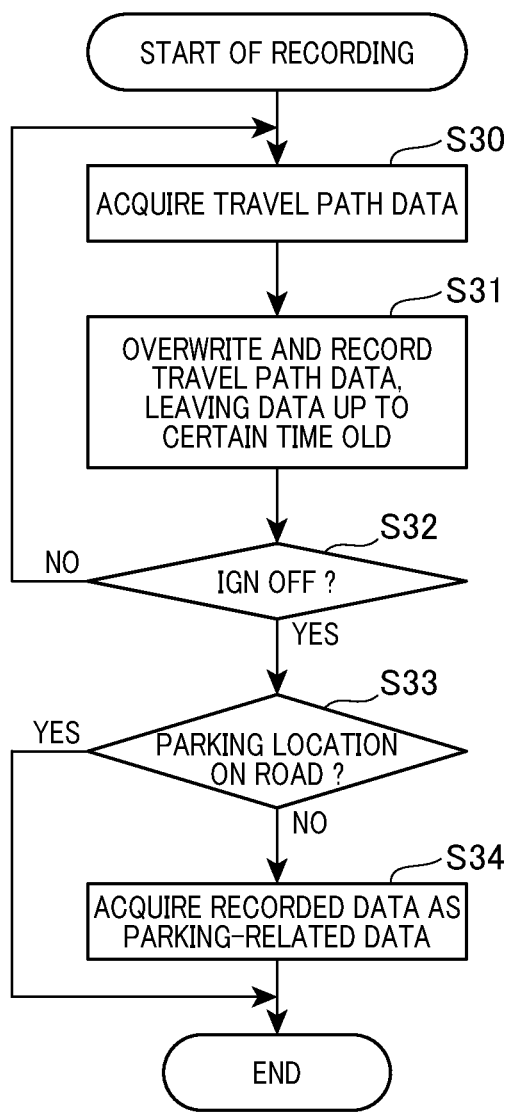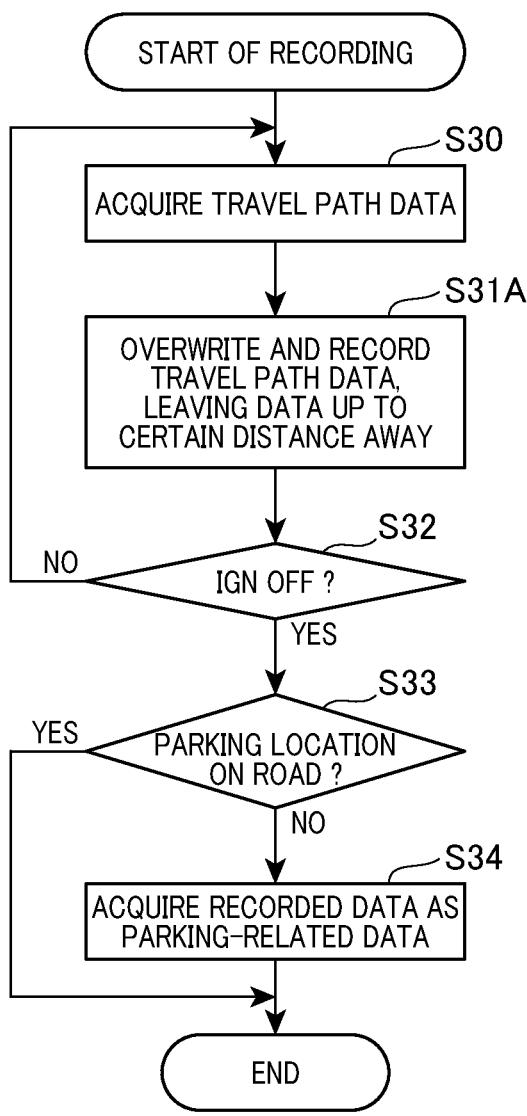

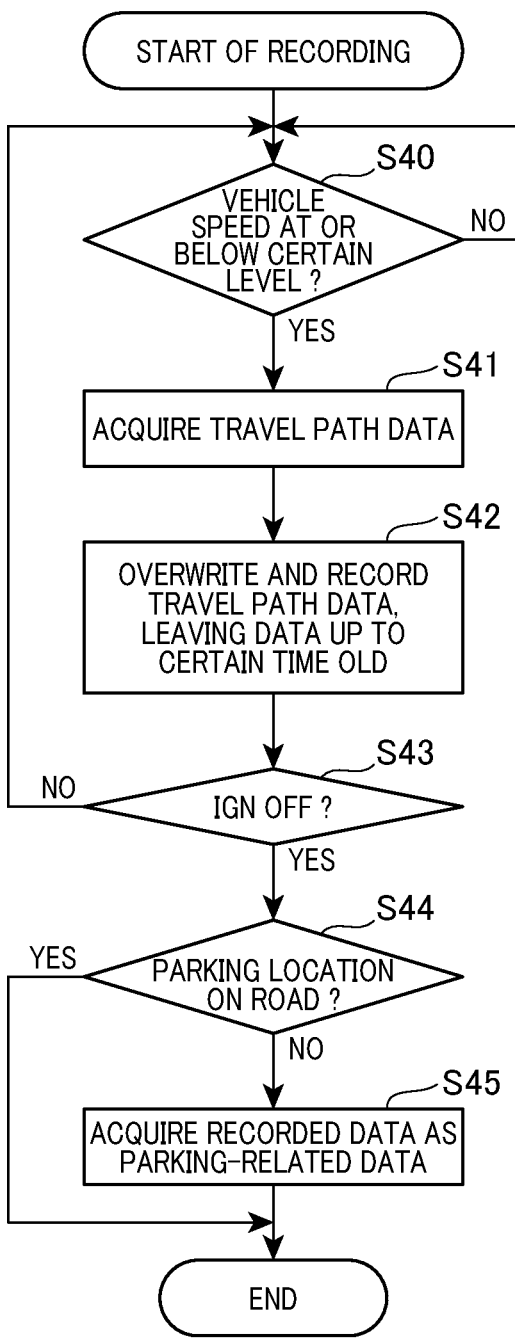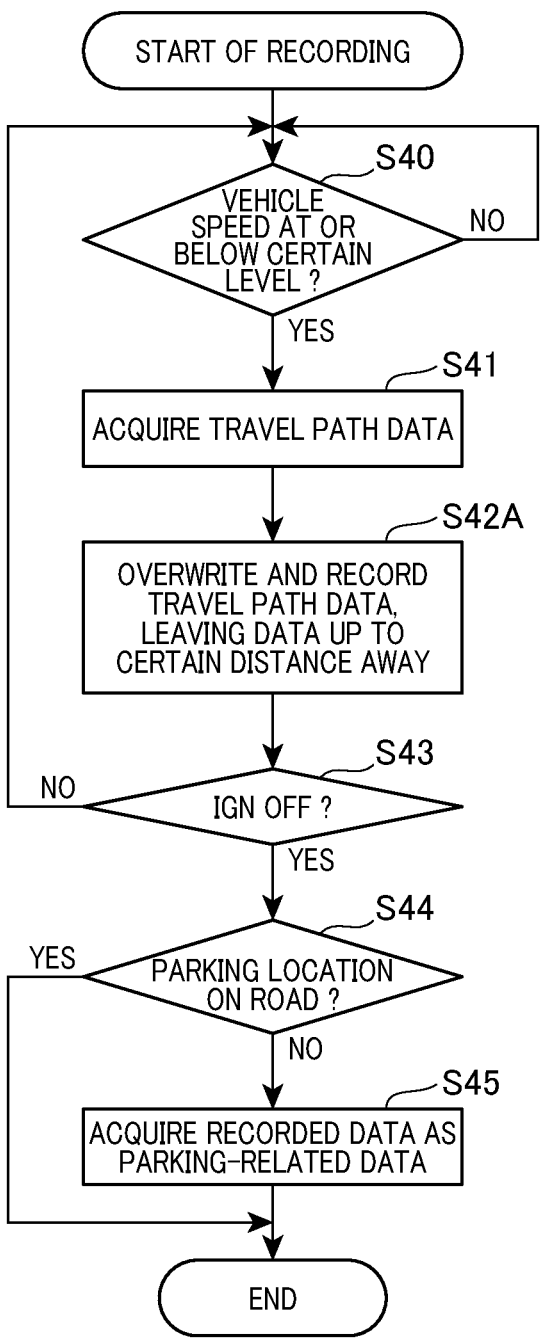

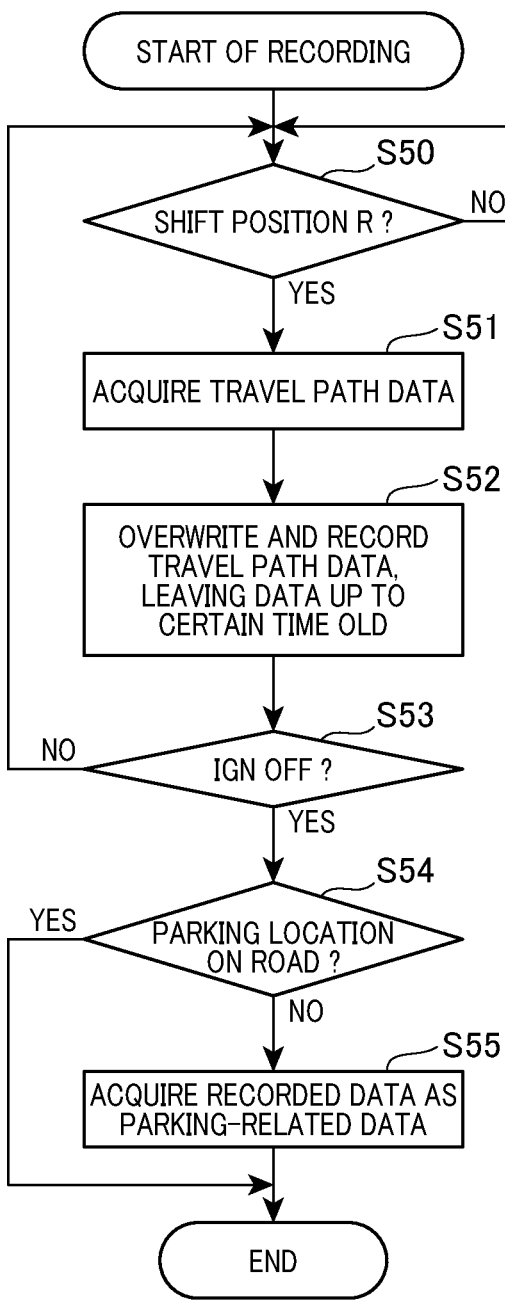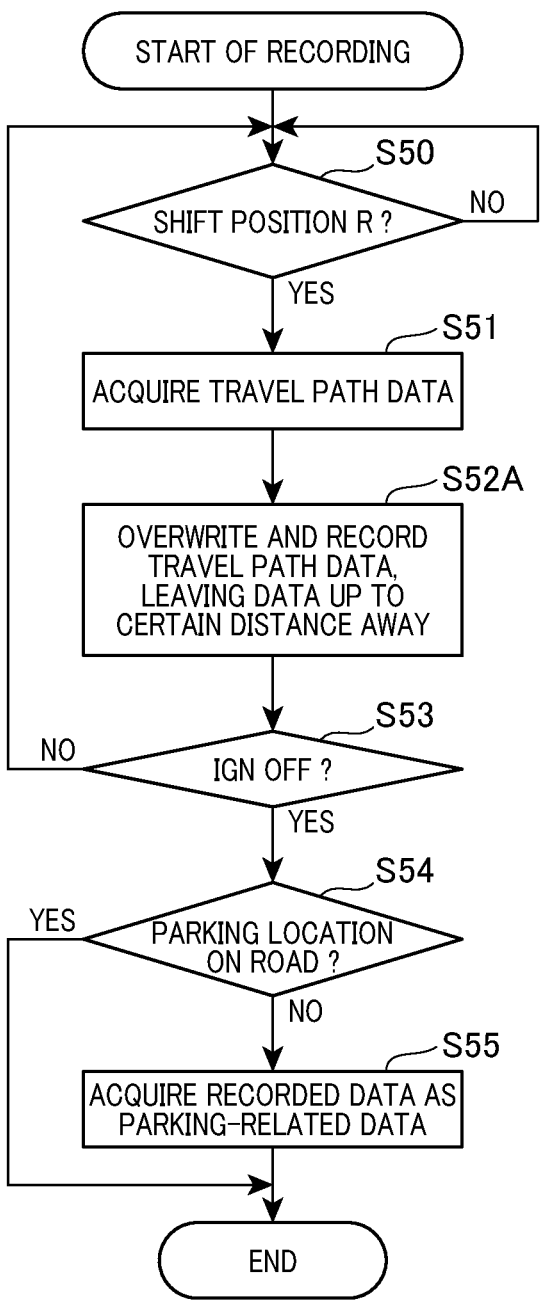

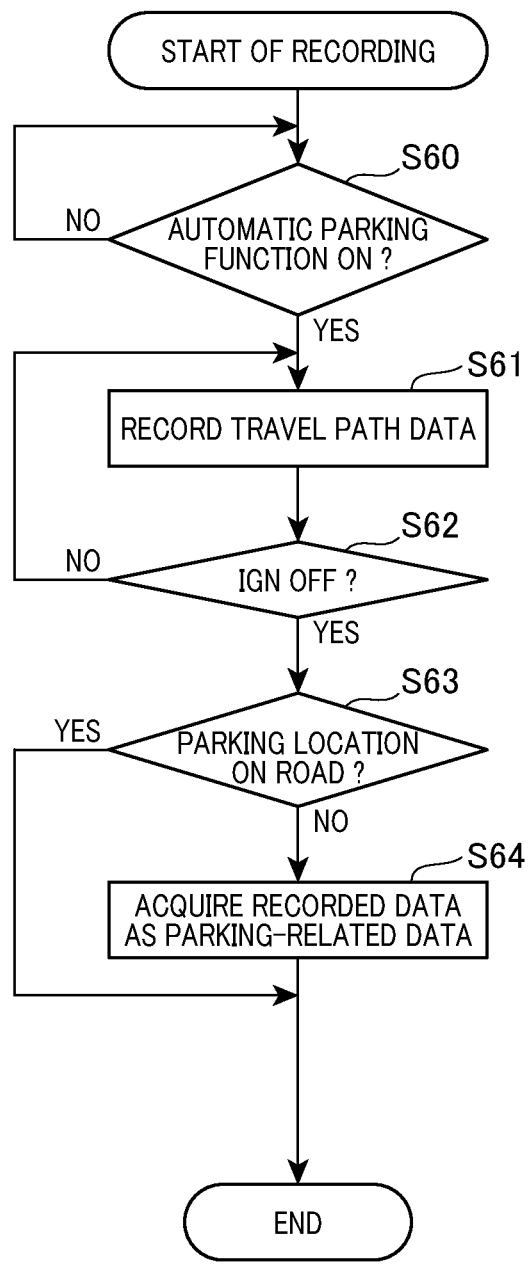

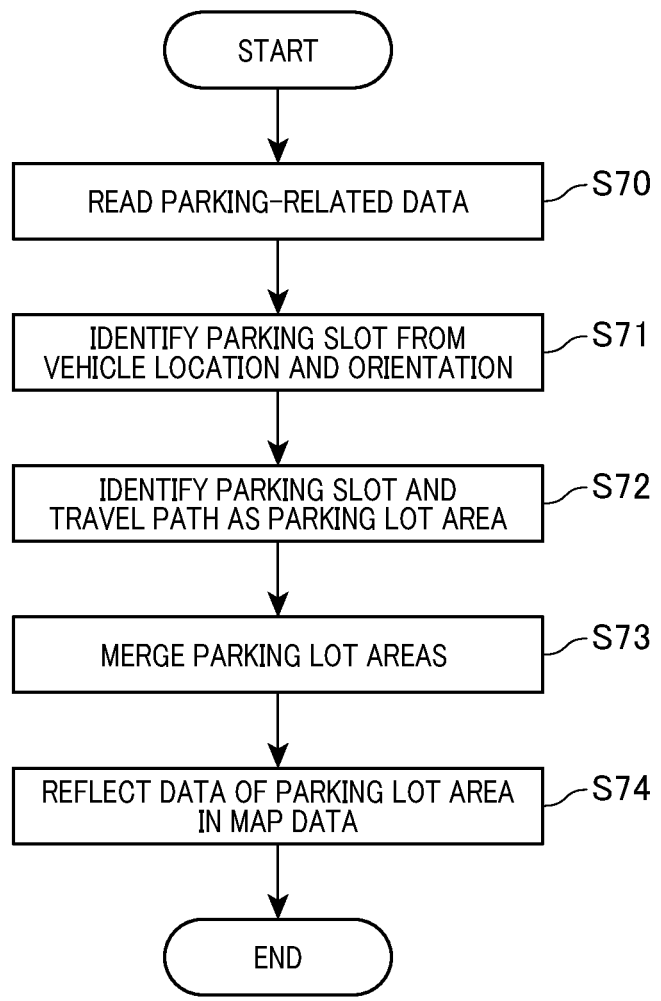

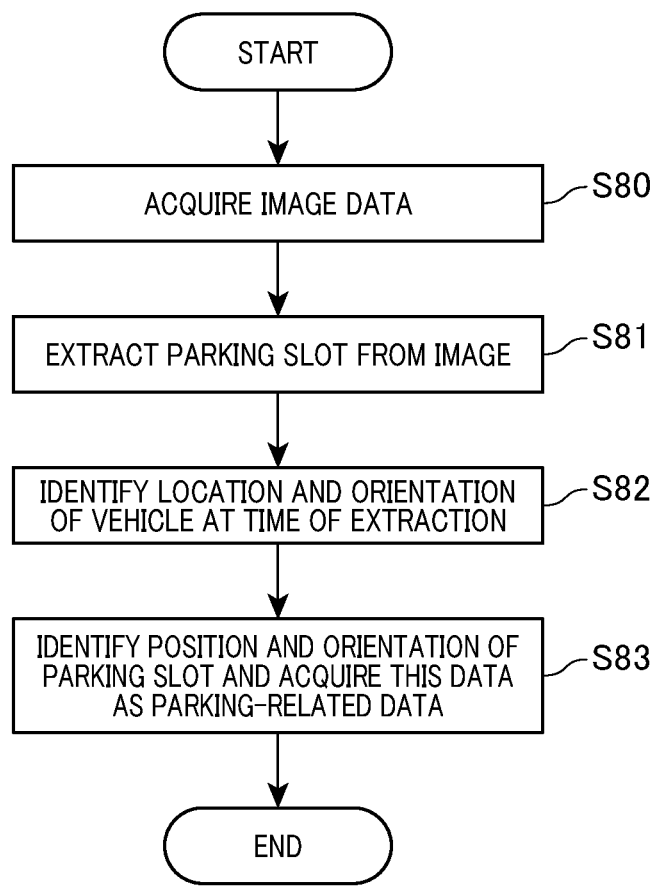

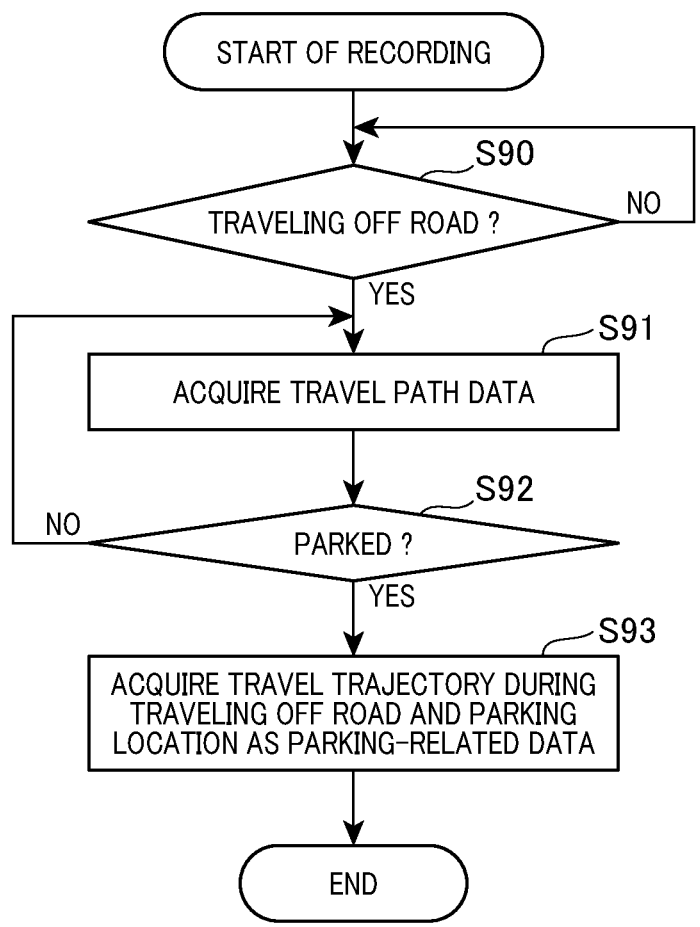

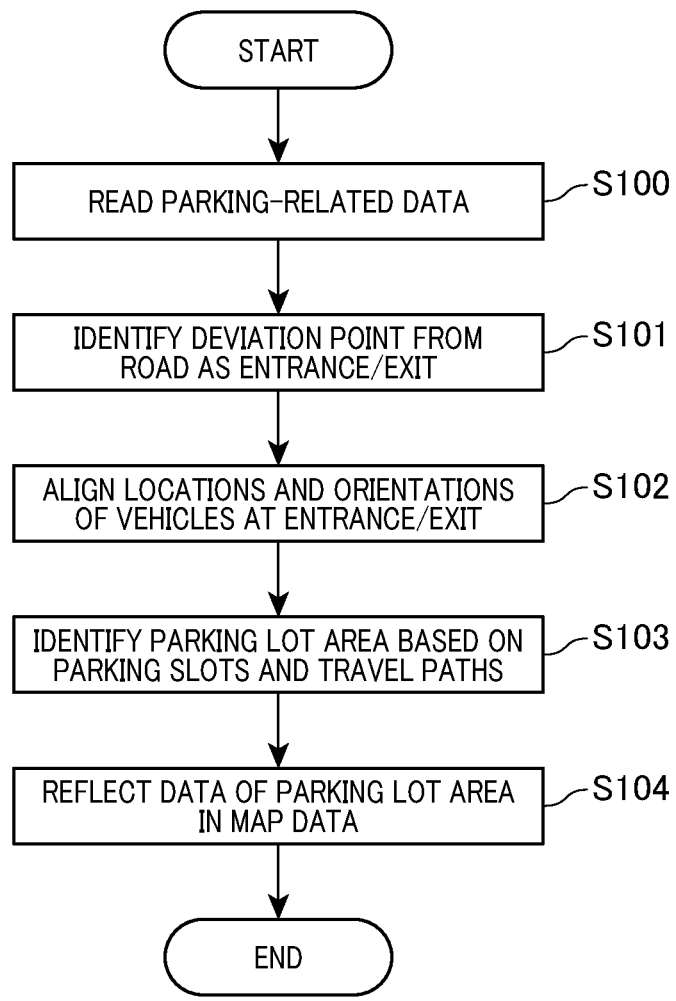

PARKING LOT IDENTIFICATION SYSTEM AND METHOD

CROSS-REFERENCE TO RELATED APPLICATION

This application is a continuation application of International Application No. PCT/JP2021/021254 filed Jun. 3, 2021 which designated the U.S. and claims priority to Japanese Patent Application No. 2020-127449 filed with the Japan Patent Office on Jul. 28, 2020, the contents of each of which are incorporated herein by reference.

BACKGROUND

Technical Field

This disclosure relates to a system for identifying a parking lot area based on data collected from a plurality of vehicles.

Related Art

Conventionally, a plurality of methods are known for estimating a parking lot based on information acquired from a plurality of vehicles. A parking lot estimation device according to a first method assigns, based on data about parking locations where vehicles are parked, an attribute "parking lot" to a mesh area that includes the parking locations. In parking lot estimation according to a second method, a determination as to whether an area subjected to determination, such as a circle or rectangle, is a parking lot is made based on the number of times vehicles were parked and other factors. The second method also includes identifying an area considered to be a parking lot based on a distribution of parking locations.

BRIEF DESCRIPTION OF THE DRAWINGS

In the accompanying drawings:

FIG. 4 is a flowchart of a process of a data center identifying a parking lot area based on received parking-related data;

FIG. 6A is a flowchart of a process of acquiring travel path data during parking actions;

FIG. 6B is a flowchart of another process of acquiring travel path data during parking actions;

FIG. 7A is a flowchart of another process of acquiring travel path data during parking actions;

FIG. 7B is a flowchart of another process of acquiring travel path data during parking actions;

FIG. 8A is a flowchart of another process of acquiring travel path data during parking actions;

FIG. 8B is a flowchart of another process of acquiring travel path data during parking actions;

FIG. 9 is a flowchart illustrating an example of, in a case where a vehicle is parked using a parking assistance function, acquiring travel path data during parking actions;

FIG. 10 is a flowchart of a process of a data center identifying a parking lot area based on received parking-related data according to the second embodiment;

FIG. 11 is a flowchart of a process performed by an overall ECU to acquire locations and orientations of parking slots as parking-related data;

FIG. 12 is a flowchart of a process of acquiring parking-related data;

FIG. 13 is a flowchart of a process of a data center identifying a parking lot area;

DESCRIPTION OF SPECIFIC EMBODIMENTS

The parking estimation device according to the first method, as disclosed in WO 2019/065328 A1, only assigns to each of segments having a predefined equal area and forming a mesh area on a map, an attribute as to whether the segment is a parking lot, but fails to identify a parking lot area.

Although a parking lot estimation device according to the second method, as disclosed in JP 2018-181024 A, identifies an area considered to be a parking lot, the parking lot estimation device is only directed to determining the number of vehicles allowed to be parked. An estimated parking space is divided by a parking space per vehicle to acquire the number of vehicles allowed to be parked, leading to estimation of an area of the estimated parking space. Therefore, a rectangle, polygon, or circle including a plurality of parking spaces is identified as an estimated parking space, but the shape of the parking lot is not estimated.

In view of the foregoing, it is desired to have a parking lot identification system that identifies a parking lot area on a map.

One aspect of the present disclosure provides a parking lot identification system comprising a control apparatus mounted to each of a plurality of vehicles and a central apparatus that communicates with the control apparatus of each of the plurality of vehicles. The control apparatus of each of the plurality of vehicles includes a parking determination unit configured to determine whether a parking action of the vehicle is recognized, a parking-related data acquisition unit configured to, in response to the parking action of the vehicle being recognized, acquire parking-related data including data of a location and an orientation of the vehicle during the parking action, and a parking-related data transmission unit configured to transmit the parking-related data to the central apparatus. The central apparatus is configured to identify a parking lot area based on the parking-related data transmitted from the plurality of vehicles.

The parking lot identification system of the present disclosure is capable of identifying a parking lot area based on parking-related data transmitted from the control apparatus mounted to the plurality of vehicles.

A vehicle equipped with a control apparatus according to each of exemplary embodiments of the present disclosure will now be described with reference to the accompanying drawings. The vehicle may be an autonomous driving vehicle or a vehicle with driving assistance functions. In the embodiments described below, an autonomous driving vehicle will be described as an example. Although it is assumed that there are a plurality of vehicles each equipped with a similar control apparatus, for illustration purposes, one of the vehicles will be described below.

First Embodiment

Figure 1:
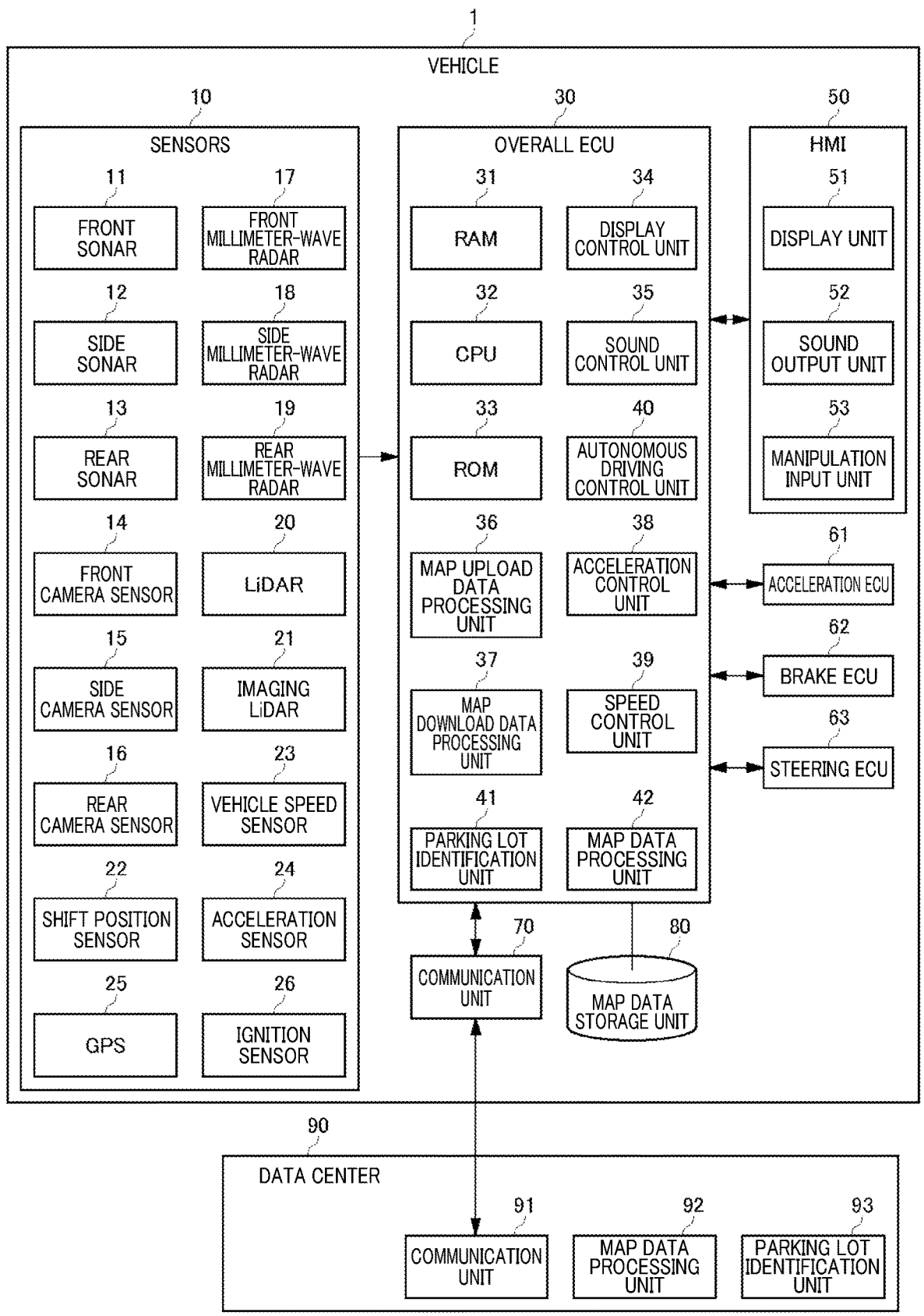
FIG. 1 is an illustration of an example system configuration of an autonomous driving vehicle according to one embodiment.

FIG. 1 illustrates a system configuration of an autonomous driving vehicle 1. The autonomous driving vehicle 1 of the present embodiment includes an overall electronic control unit (ECU) 30 that performs autonomous driving control, sensors 10 that detect conditions of the vehicle and surroundings of the vehicle, various ECUs that control vehicle equipment according to instructions from the overall ECU 30, a human machine interface (HMI) 50 that is an interface with a driver, a communication unit 70 that communicates with a data center 90, and a map data storage unit 80 storing map data. The overall ECU 30 corresponds to a control apparatus, and the data center 90 corresponds to a central apparatus.

As illustrated in FIG. 1, various ECUs include an acceleration ECU 61, a brake ECU 62, and a steering ECU 63. The autonomous driving vehicle 1 may be equipped with other types of ECUs not illustrated in FIG. 1. The HMI 50 includes a display unit 51 that displays information to the driver, a sound output unit 52 that outputs sound, and a manipulation input unit 53 that receives manipulation inputs from the driver or occupants.

The sensors 10 include, as sensors to detect objects outside the vehicle, a front sonar 11, a side sonar 12, a rear sonar 13, a front camera sensor 14, a side camera sensor 15, a rear camera sensor 16, a front millimeter-wave radar 17, a side millimeter-wave radar 18, a rear millimeter-wave radar 19, a LiDAR 20, and an imaging LiDAR 21. The sensors 10 include a shift position sensor 22, a vehicle speed sensor 23, an acceleration sensor 24, and an ignition sensor 26, as sensors for detecting the state of the vehicle. The sensors 10 further include a GPS 25 that measures the location of the vehicle. The autonomous driving vehicle 1 may be equipped with sensors not illustrated in FIG. 1.

The overall ECU 30 includes a RAM 31, a CPU 32, a ROM 33, a display control unit 34, a sound control unit 35, a map upload data processing unit 36, a map download data processing unit 37, an acceleration control unit 38, a speed control unit 39, and an autonomous driving control unit 40. The overall ECU 30 controls autonomous driving, acquires parking-related data when the vehicle is parked, and transmits the acquired parking-related data to the data center 90. The parking-related data is data of the vehicle and the surroundings of the vehicle, acquired when parked. In the first embodiment, the parking-related data is data of the location and orientation of the vehicle when parked.

The overall ECU 30 corresponds to a control apparatus. The display control unit 34 and the voice control unit 35 communicate with the HMI 50 and control the HMI 50 to provide a user interface with the driver. The acceleration control unit 38 and the speed control unit 39 communicate with the acceleration ECU 61 and the brake ECU 62 to control acceleration and braking. The map upload data processing unit 36 and the map download data processing unit 37 communicate with the data center 90 through the communication unit 70 to upload and download map data. The map download data processing unit 37 stores the received map data in the map data storage unit 80. Here, the map data may be of any type, including high-precision maps, navigation maps, and maps generated from probe data. The parking lot identification unit 41 and the map data processing unit 42 will be described later.

The data center 90 includes a communication unit 91, a map data processing unit 92, and a parking lot identification unit 93. In the data center 90, the map data processing unit 92 processes the map data uploaded from the vehicle and updates the map data with the latest map data. The data center 90 delivers the latest map data to the vehicle in response to a demand from the vehicle or at regular intervals. The parking lot identification unit 93 identifies a parking lot area using parking-related data transmitted from a plurality of vehicles. The communication unit 91 corresponds to a parking-related data reception unit. The parking lot identification unit 93 corresponds to a parking area identification unit.

Figure 2:
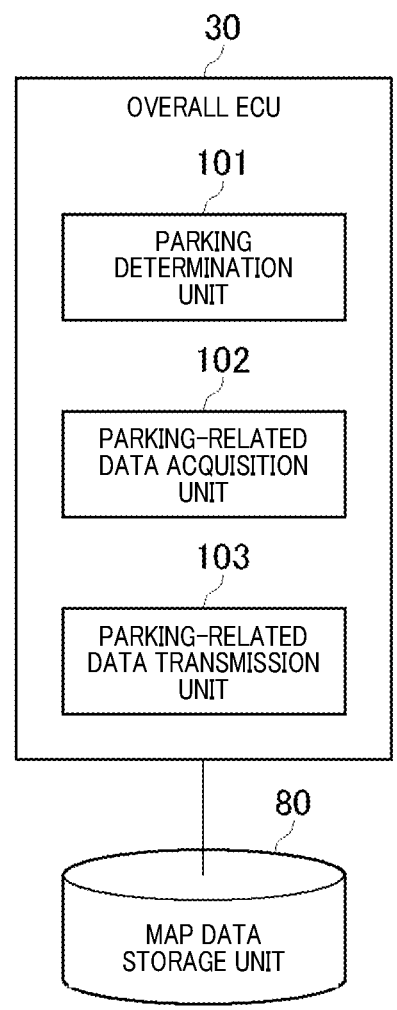
FIG. 2 is an illustration of an example configuration of applications related to the embodiment.

FIG. 2 illustrates a configuration of an application related to the present embodiment. The application is implemented by the CPU 32 executing a program stored in the RAM 31 or the ROM 33. Such a program is also included in the scope of this disclosure.

The overall ECU 30 includes, as functional blocks related to processing of the parking-related data, a parking determination unit 101, a parking-related data acquisition unit 102, and a parking-related data transmission unit 103. The parking determination unit 101 determines whether the vehicle has been parked, based on data from the sensors 10 provided in the vehicle. In response to the parking determination unit 101 determining that the vehicle has been parked, the parking-related data acquisition unit 102 acquires parking-related data, including data of the parking location and orientation of the vehicle. The parking-related data transmission unit 103 transmits the parking-related data to the data center 90. The term "in response to" in the present and subsequent embodiments of the present disclosure may mean a timing or event.

The parking determination unit 101 determines whether the vehicle has been parked, based on data from the ignition sensor 26 provided in the vehicle. In response to detecting that the ignition key is off, the parking determination unit 101 determines that the vehicle has been parked.

The parking-related data acquisition unit 102 acquires the location and orientation of the vehicle when parked as parking-related data. In a case where the location of the vehicle when parked is on a road, the parking-related data acquisition unit 102 does not acquire the location and orientation of the vehicle when parked as parking-related data. This is because where, in such a case where the location of the vehicle when parked is on a road, it may be considered that the vehicle is only temporarily parked on the road and not in a parking area. Whether the location of the vehicle when parked is on the road may be determined based on the map data stored in the map data storage unit 80 and the location of the own vehicle. As above, an example where the parking-related data is not acquired in a case where the location of the vehicle when parked is on a road has been described. In an alternative configuration, the parking-related data may be acquired even in such a case where the location of the vehicle when parked is on a road, but may not be transmitted to the data center 90.

The parking-related data acquisition unit 103 transmits the acquired parking-related data to the data center 90. Specifically, the parking-related data transmission unit 103 forwards the parking-related data to the communication unit 70 and directs the communication unit 70 to transmit the parking-related data to the data center 90. The parking-related data transmission unit 103 does not transmit the parking-related data to the data center 90 in a case where the parking location is within a known parking lot area. A reason for transmitting the parking-related data to the data center 90 is for the data center 90 to identify a parking lot area. Therefore, the parking-related data is not needed in a case where it is already known that the parking location is in a parking lot area. Not transmitting the parking-related data in such a case can reduce burdens on the data center 90. During transmission of the parking-related data to the data center 90, the HMI 50 may notify the driver of the fact that the parking-related data is in transmission.

Figure 3:
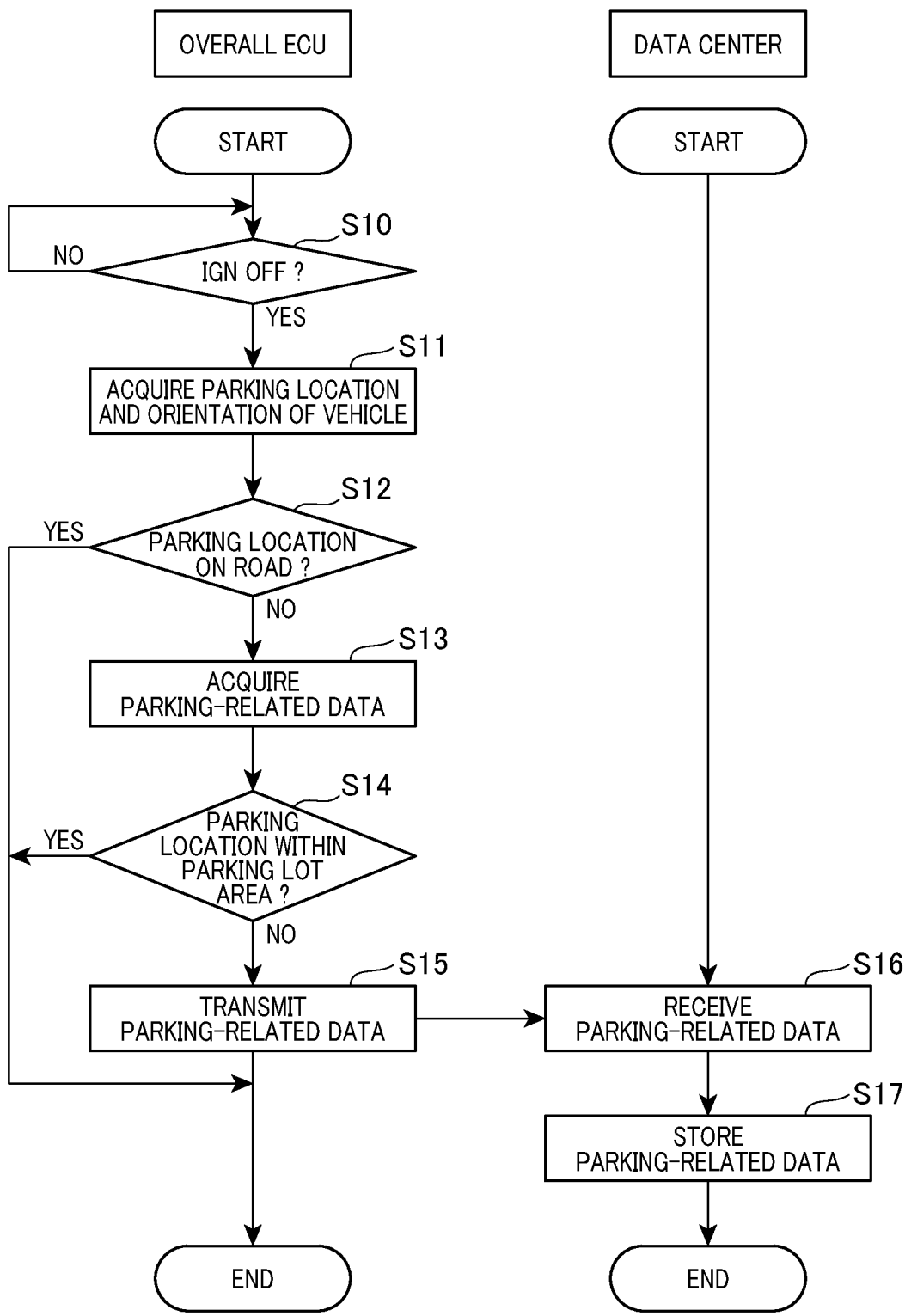
FIG. 3 is a flowchart of a process of an autonomous driving vehicle transmitting parking-related data according to a first embodiment.

FIG. 3 is a flowchart of a process of the autonomous driving vehicle transmitting parking-related data according to the first embodiment. The overall ECU 30 mounted to the autonomous driving vehicle determines whether the ignition key is OFF based on data from the ignition sensor 26 (at S10). If the ignition key is OFF ("NO" branch of S10), the overall ECU 30 repeats this process step until determining that the ignition key is OFF.

If the overall ECU 30 detects that the ignition key is OFF ("YES" branch of S10), the overall ECU 30 determines that the vehicle is parked and acquires data of the parking location and orientation of the vehicle (at S11). The overall ECU 30 reads the map data from the map data storage unit 80 and determines whether the parking location is on a road (at S12). If the parking location is on a road ("YES" branch of S12), the overall ECU 30 does not proceed to acquire the parking-related data and terminates the process. If the parking location is not on a road ("NO" branch of S12), the overall ECU 30 acquires data of the parking location and orientation of the vehicle as parking-related data (at S13).

The overall ECU 30 then determines whether the parking location indicated by the parking-related data is within a known parking lot area (at S14). If the parking location is not within a known parking lot area (NO in S14), the overall ECU 30 transmits the parking-related data to the data center 90 (at S15). Transmission timings include, but are not limited to, (1) a timing during a power latch period after the ignition key is turned off and (2) a timing when the vehicle is started next time. In the present embodiment, the vehicle is equipped with the communication unit 70. In a case where the vehicle is not equipped with the communication device 70, the parking-related data may be transmitted via another vehicle that can transmit data to the data center 90, infrastructure provided in a parking lot, or a portable terminal owned by the driver.

If the parking location indicated by the parking-related data is within a known parking area ("YES" branch of S14), the overall ECU 30 does not proceed to transmit the parking-related data. The data center 90 receives the parking-related data transmitted from the vehicle (at S16) and stores the received parking-related data (at S17).

FIG. 4 is a flowchart of a process of the data center 90 identifying a parking lot area based on the received parking-related data. Upon the data center 90 acquiring the parking-related data from a number of vehicles, the data center 90 identifies a parking lot area using the parking-related data. The timing for identifying a parking lot area may be on a regular basis or when the collected parking-related data reaches a predefined threshold.

The parking lot identification unit 93 of the data center 90 reads the parking-related data from a storage unit (not shown) (at S20) and identifies a parking lot area based on the parking location and orientation of the vehicle indicated by the read parking-related data. For example, a rectangle of 4 m (length)×2 m (width) may be identified as a parking slot based on the parking location and orientation (at S21). The parking lot identification unit 93 then clusters the identified parking slots based on locations of the parking slots (at S22) and identifies a parking lot area by grouping together the parking slots classified into in the same group (at S23).

At this time, the parking lot identification unit 93 adjusts the size of the parking slots based on a positional relationship between the parking slots classified into the same group. For example, in the above, the parking slot is specified as a rectangle of 4 m (length)×2 m (width). In a case where adjacent parking slots are 3 m (height) apart from each other, the parking slot may be adjusted to be a rectangle of 4 m (length)×3 m (width). The parking lot identification unit 93 reflects the data of the identified parking lot area in the map data (at S24).

The parking area identification system and the parking area identification method of the first embodiment have been described above. In the parking lot identification system of the first embodiment, the overall ECU 30 installed in the vehicle acquires parking-related data including the parking location and orientation of the vehicle and transmits the parking-related data to the data center 90, and the data center 90 identifies a parking lot area based on the parking-related data. This enables accurate identification of a parking lot area.

Second Embodiment

A parking lot identification system according to a second embodiment will now be described. The parking lot identification system according to the second embodiment is similar in basic configuration to the parking lot identification system according to the first embodiment (see FIG. 1). The parking lot identification system of the second embodiment uses, as parking-related data, travel path data of a vehicle during parking actions, in addition to the parking location and orientation of the vehicle.

Figure 5A:
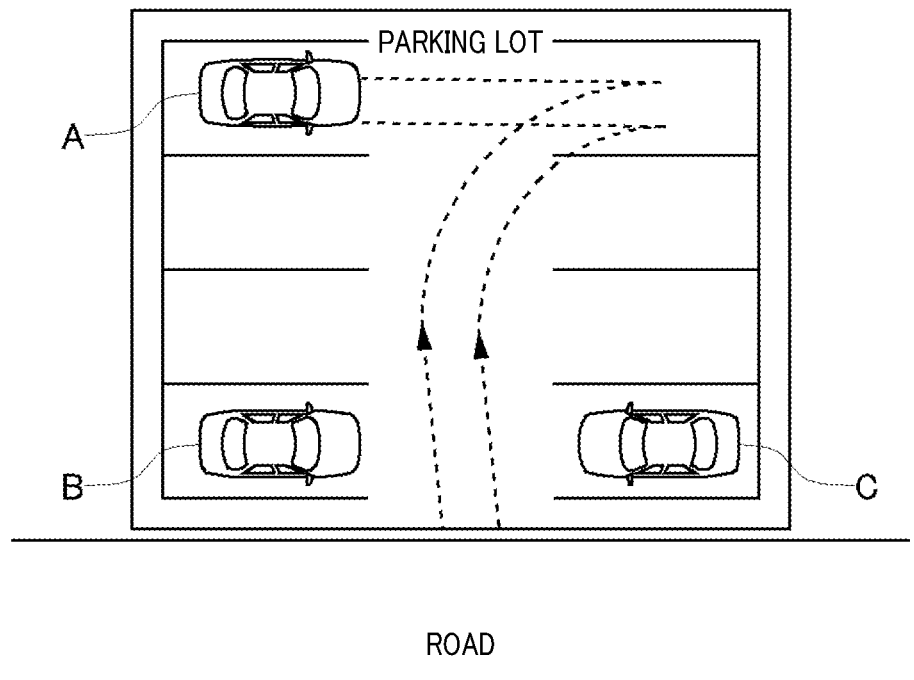
FIG. 5A is a schematic of a parking lot identification system according to a second embodiment.
Figure 5B:
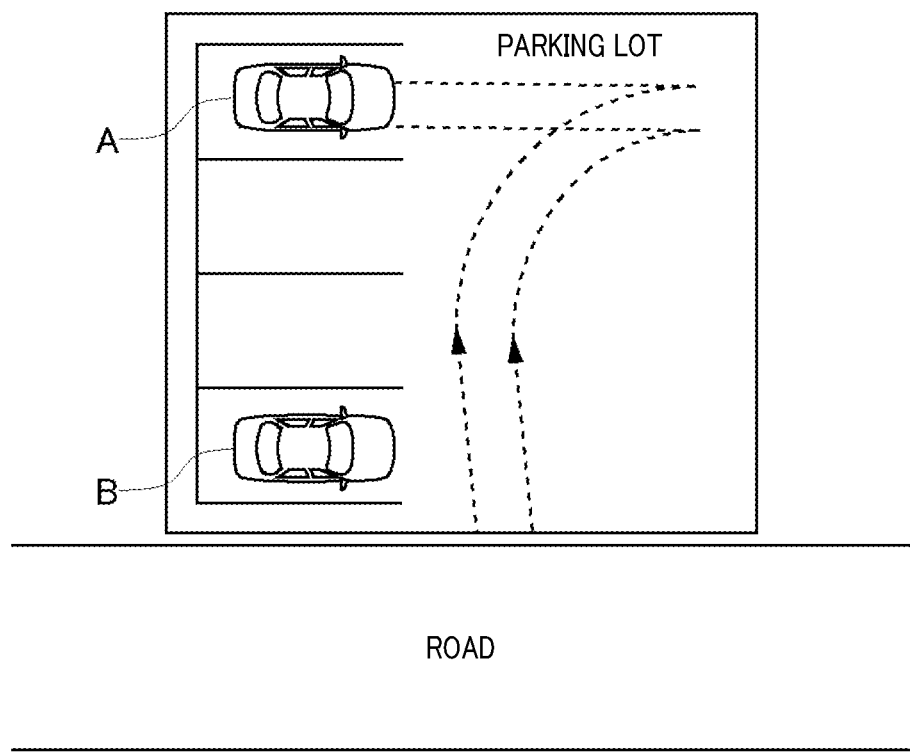
FIG. 5B is a schematic of a parking lot identification system according to the second embodiment.

FIGS. 5A and 5B schematically illustrate the parking lot identification system of the second embodiment. FIG. 5A illustrates a scene where a vehicle enters a parking lot with two rows of four parking slots from a road, steers sharply to the left, and is parked in the innermost parking slot. FIG. 5B illustrates a scene where a vehicle enters a parking lot with one row of four parking slots from a road, steers sharply to the left, and is parked in the innermost parking slot.

Attempting to identifying a parking lot area based on data of parking locations and orientations of vehicles may result in parking slots in each row not being clustered in the same group and identified as two parking lot areas in the example illustrated in FIG. 5A. In the example illustrated in FIG. 5B, the travel path traveled by the vehicle is not recognized as a parking lot area. The parking lot identification system of the second embodiment can also properly identify aisles within a parking lot area as the parking lot area by using travel path data of vehicles during parking actions. From the above description, the parking lot area does not only refer to parking slots, but also includes aisles leading vehicles to the parking slots. The parking lot areas include, for example, an area such as the interior of a gated community with a wall around the perimeter of a residential area to restrict access, as well as a cul-de-sac in a residential area.

In the parking lot identification system of the second embodiment, the parking-related data acquisition unit 102 acquires travel path data during parking actions. Acquisition of the travel path data in the second embodiment will now be described.

FIG. 6A is a flowchart of a process of acquiring travel path data during parking actions. The parking-related data acquisition unit 102 acquires travel path data during parking actions, where the parking actions are driving actions between the time of detection when parking of the vehicle is detected and a certain or predefined time before the time of detection.

The overall ECU 30 acquires travel path data (at S30), and overwrites and records the acquired travel path data, leaving data up to a certain or predefined time old (at S31). The overall ECU 30 determines whether the ignition key is off based on data from the ignition sensor 26 (at S32). If it is not determined that the ignition key is off ("NO" branch of S32), the overall ECU 30 continues to acquire, overwrite and record the travel path data.

If it is determined that the ignition key is off ("YES" branch of S32), the overall ECU 30 reads map data from the map data storage unit 80 and determines whether the parking location is on a road (at S33). If the parking location is on a road ("YES" branch of S33), the overall ECU 30 terminates acquisition of parking-related data. If the parking location is not on a road ("NO" branch of S33), the overall ECU 30 acquires the travel path data recorded for a certain or predefined time period as parking-related data (at S34).

According to the recording operations illustrated in FIG. 6A, data that is more than a certain or predefined period of time old is overwritten and erased, which can keep the storage capacity of the storage for storing the travel path data constant.

FIG. 6B is a flowchart of another process of acquiring travel path data during parking actions. The parking-related data acquisition unit 102 acquires travel path data during parking actions, where the parking actions are driving actions between the parking location of the vehicle and a location at a certain or predefined distance away from the parking location.

The flowchart illustrated in FIG. 6B differs from the flowchart illustrated in FIG. 6A in that the travel path data is overwritten and recorded, leaving data up to a certain or predefined distance away instead of leaving data up to a certain or predefined time old. Based on the travel path data, the travel path data at a distance greater than or equal to a predefined distance is overwritten by the travel path data from a location when the vehicle was at the predefined distance from the current location to the current location (at S31A). This enables acquisition of travel path data between the parking location of the vehicle and a location at a certain or predefined distance away from the parking location, regardless of the speed of the vehicle when parked.

A number of variations on the method of acquiring travel path data during parking actions are envisioned. The variations will now be described with reference to FIGS. 7 to 9.

FIG. 7A is an example of identifying parking actions using data from the travel speed of the vehicle as well. The overall ECU 30 determines the vehicle speed based on data from the vehicle speed sensor 23 (at S40). If the vehicle speed is at or below a certain level ("YES" branch of S40), the overall ECU 30 acquired travel path data (at S41-S45) in the same manner as in the flow (S30-S34) described in FIG. 6A.

Since the speed of the vehicle is considered to be slow during parking actions, travel path data is not acquired if the speed of the vehicle is above the certain level ("NO" branch of S40). In the example illustrated in FIG. 7B, the overall ECU 30 acquires travel path data (S41-S45) in the same manner as in the flow (S30-S34) described in FIG. 6B if the vehicle speed is at or below a certain level ("YES" branch of S40).

FIG. 8A is a flowchart illustrating an example of identifying parking actions using shift position data as well. The overall ECU 30 determines the vehicle speed based on data from the shift position sensor 22. The overall ECU 30 determines whether the shift position is in a reverse drive position (R-position) (at S50), and if the shift position is in the R position ("YES" branch of S50), the overall ECU 30 acquires the travel path data (at S51-S55) in the same manner as in the flow (S30-S34) described in FIG. 6A. When the vehicle is moving backward, the vehicle is considered to be taking a parking action. If the shift position is not in the R-position ("NO" branch of S50), travel path data is not acquired. In the example illustrated in FIG. 8B, if the shift position is the R-position (YES in S50), the overall ECU 30 acquires travel path data (S51-S55) in the same manner as in the flow (S30-S34) described in FIG. 6B.

FIG. 9 is a flowchart illustrating an example of, in a case where the vehicle is parked using a parking assistance function, acquiring travel path data during parking actions that are driving actions while parking assistance being performed. In the parking assistance function, upon a target parking location being set, a parking assistance application calculates a route to the target parking location, and guides the vehicle to the target parking location or assists the deriver in driving to the target parking location. The parking assistance function may use data from the sensors 11, 12, 13, 14, 15, 16, 17, 18, 19, 20, and 21 for guidance to the target parking location (e.g., for detecting a parking slot to be used for guidance). The parking assistance function may cause the driver to perform some of steering control, acceleration control, braking control, and surroundings monitoring, or may be an automatic parking function enables the vehicle to travel automatically to the target parking location without driver's interventions. The parking assistance function may, for example, use at least one of data from the camera sensors 14, 16 and map data to search for or set an available parking slot as a target parking location without instructions from the driver. The parking assistance function may assist with parallel parking. The parking assistance function may be turned on and off by an operating terminal, such as a smart phone, in an unmanned state after the driver has moved from inside to outside the vehicle, for example, to park in a narrow space.

The overall ECU 30 determines whether the parking assistance function has been turned on at the autonomous driving control unit 40 (at S60). This is an example of the determination of whether parking actions of the vehicle are allowed. If it is determined that the parking assist function has been turned on ("YES" branch of S60), the overall ECU 30 records travel path data until the ignition key is turned off (at S61). If the ignition key is turned off ("YES" branch of S62), the overall ECU 30 determines that parking of the vehicle is completed, and the overall ECU 30 reads map data from the map data storage unit 80 to determine whether the parking location is on a road (at S63). If the parking location is not on a road ("NO" branch in S63), the overall ECU 30 acquires the recorded travel path data as parking-related data (at S64). In a case where the parking assistance function is turned off automatically upon completion of parking of the vehicle, travel path data may be recorded at S61 until the parking assistance function is turned off, and during a period from when the parking assistance function is turned off to when the ignition key is turned off, the process steps up to S64 and transmission of parking-related data may be performed. Additionally, at the timing when the parking assistance function is turned on or during operation of the parking assistance function, a scheduled automatic parking route and a target parking location may be transmitted from the vehicle to the data center 90 as parking-related data.

FIG. 10 is a flowchart of a process of identifying a parking lot area based on the parking-related data received by the data center 90 according to the second embodiment. The parking lot identification unit 93 of the data center 90 reads the parking area-related data transmitted from the overall ECU 30 of each vehicle and stored in the storage unit (at S70). In the present embodiment, the parking-related data includes travel path data during parking actions, in addition to the parking location and orientation of each vehicle.

The parking lot identification unit 93 identifies parking slots based on the locations and orientations of the vehicles (at S71), and identifies the identified parking slots and travel paths leading to the parking slots as parking lot areas (at S72). The parking lot identification unit 93 merges the parking lot areas determined from the individual parking slots to acquire a parking lot area (at S73). In the present embodiment, the individual parking slots are connected via the travel paths to acquire the entire parking lot area. The parking lot identification unit 93 reflects data of the acquired parking lot area in the map data (at S74).

The parking lot identification system of the second embodiment identifies a parking lot area using travel path data of vehicles during parking actions, which allows for properly determining a parking lot area, including not only parking slots but also aisles leading to the parking slots.

Third Embodiment

A parking lot identification system according to a third embodiment will now be described. The parking lot identification system according to the third embodiment is similar in basic configuration to the parking lot identification system according to the first embodiment (see FIG. 1). The parking lot identification system uses as parking-related data not only the data of parking slots where vehicles are parked, but also data of parking slots acquired by image processing from images captured from vehicles.

FIG. 11 is a flowchart of a process performed by the overall ECU 30 to acquire parking locations and orientations of parking slots as parking-related data. The parking-related data acquisition unit 102 acquires image data from the front camera sensor 14, the side camera sensor 15, the rear camera sensor 16 (at S80). The image data may be acquired during parking actions.

The parking-related data acquisition unit 102 extracts parking slots from the acquired image data by image processing (at S81). Extraction of parking slots may be performed by pattern matching or by semantic segmentation of images using learned models.

The parking-related data acquisition unit 102 identifies the position and orientation of the vehicle at the timing when a frame from which the parking slots are extracted is captured, identifies the positions and orientations of the extracted parking slots based on the position and orientation of the vehicle and the positions of the extracted parking slots in the image (at S82), and acquires position and orientation data of these parking slots as parking-related data (at S83). In extracting parking slots from the image data, dimensions of each parking slot may also be acquired.

The overall ECU 30 transmits to the data center 90 not only data of the parking slot in which the own vehicle is parked, but also data of other parking slots, as parking-related data. Transmission of parking-related data is the same as in the first embodiment, and is performed in the same manner as steps S14-S17 of the flowchart in FIG. 3.

The data center 90 identifies a parking lot area using the data of parking slots transmitted from the overall ECU 30 mounted to the vehicle.

The parking lot identification system of the third embodiment also acquires data of other parking slots and transmits such data to the data center 90, which allows for covering data of parking slots in a parking lot area even if not all of the parking slots in the parking lot area are occupied by parked vehicles.

In the above description, a specific example of using image data to identify other parking slots is provided. Alternatively, other parking slots may be estimated using data other than image data. For example, by using data from an object detection sensor, a spacing between parked vehicles may be estimated as parking slots. In this manner, the object detection sensor may be used to estimate parking slots in a parking lot area.

Forth Embodiment

A parking lot identification system according to a fourth embodiment will now be described. The parking lot identification system according to the fourth embodiment is similar in basic configuration to the parking lot identification system according to the first embodiment (see FIG. 1). The parking lot identification system of the fourth embodiment uses off-road travel path data in addition to parking locations and orientations of vehicles as parking-related data.

In the parking lot identification system of the fourth embodiment, the parking lot identification data acquisition unit 102 acquires travel path data, compares the travel path with map data stored in the map data storage unit 80, and acquires off-road travel path data when the travel path is off-road. The parking-related data transmission unit 103 transmits the off-road travel path data and the parking location to the data center 90 as parking-related data.

The parking-related data acquisition unit 102 detects a travel location of the vehicle using the GPS 25. The parking-related data acquisition unit 102 determines whether the travel location of the vehicle is off a road with reference to map data read from the map data storage unit 80 (at S90). If the travel location is on a road ("NO" branch of S90), the parking-related data acquisition unit 102 repeats the determination of whether the travel location is off a road.

If the travel location of the vehicle is off a road ("YES" branch of S90), the parking-related data acquisition unit 102 acquires travel path data (at S91).

The parking-related data acquisition unit 102 determines whether the vehicle has been parked (at S92). If the vehicle has not been parked ("NO" branch of S92), the parking-related data acquisition unit 102 continues to acquire travel path data (at S91). If the vehicle has been parked ("YES" branch of S92), the parking-related data acquisition unit 102 acquires a travel trajectory during traveling off the road and a parking location of the vehicle as parking-related data (at S93). If the vehicle traveling off the road returns to the road without been parked, this flow may be terminated.

FIG. 13 is a flowchart of a process of identifying a parking lot area based on parking-related data received by the data center 90. Upon acquiring parking-related data from a number of vehicles, the data center 90 identifies a parking lot area using the parking-related data. The parking lot identification unit 93 of the data center 90 reads the parking-related data from the storage unit (at S100) and identifies a deviation point from the road as an entrance/exit of a parking lot based on off-road travel path data as one item of the parking-related data (at S101).

Figure 14:
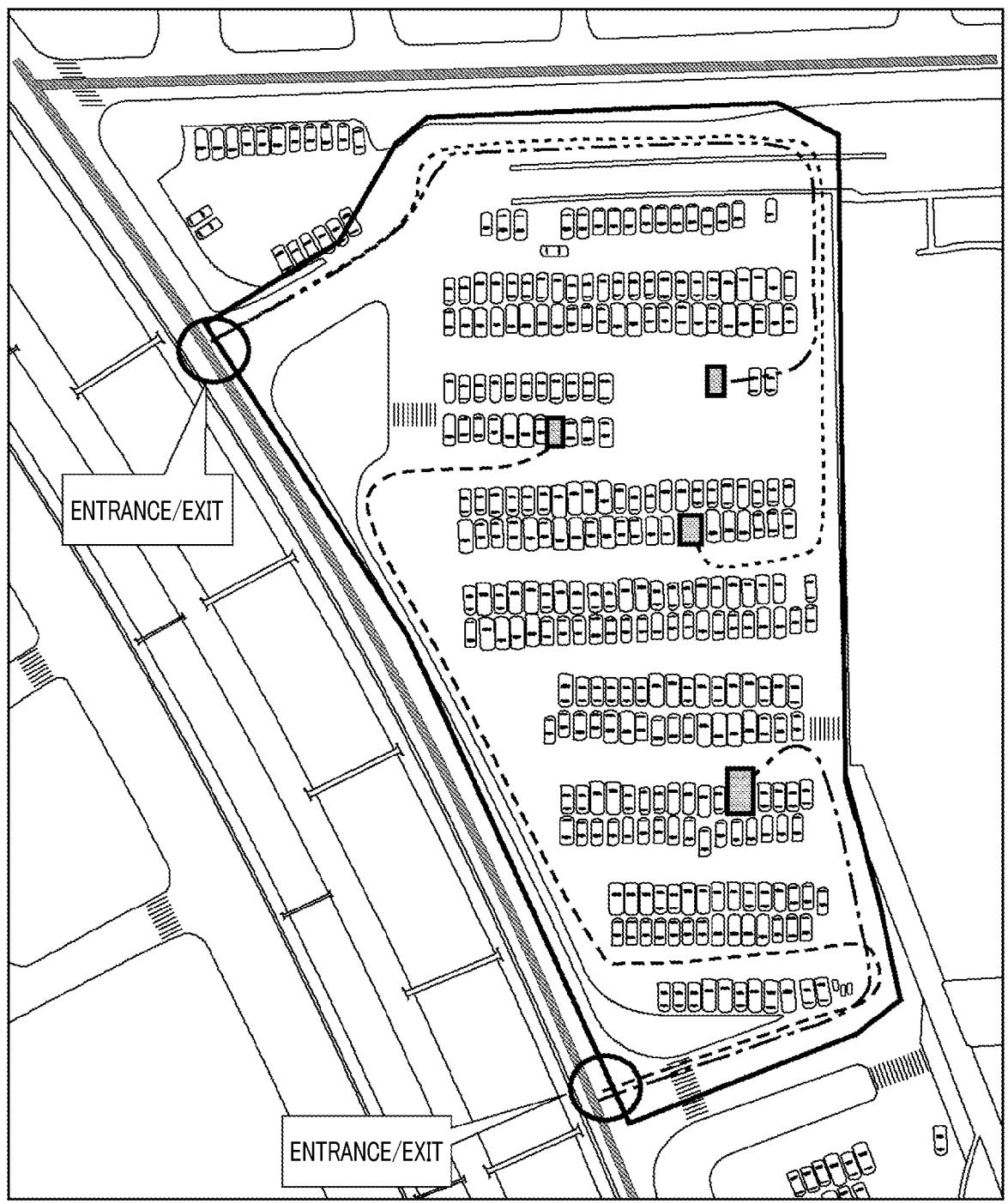
FIG. 14 is an illustration of a parking lot of a shopping mall located on the side of a road.

FIG. 14 illustrates a parking lot of a shopping mall located on the side of a road. In FIG. 14, road links are indicated by bold lines. Vehicles traveling on the road deviate from the road and enter this parking lot. Therefore, points where vehicles deviate from the road and begin traveling off the road are identified as entrances/exits.

The parking lot identification unit 93 uses data of the identified entrances/exits to align the locations and orientations of vehicles at each entrance/exit for the parking-related data transmitted from the vehicles (at S102). Although data of the locations and orientations of the vehicles detected by GPS may deviate from actual data, aligning the locations of the vehicles at each entrance/exit may provide a reference for superimposing travel trajectories of many vehicles. The parking lot identification unit 93 identifies a parking lot area based on the off-road travel trajectories and parking slots (at S103). The parking lot identification unit 93 reflects data of the identified parking lot area in the map data (at S104).

The configuration and operations of the parking lot identification system of the fourth embodiment have been described above. The parking lot identification system of the fourth embodiment uses travel trajectories during off-road travel as parking-related data to identify points of deviation from the road as entrances/exits of a parking lot. This allows for reflecting where entrances/exits of a parking lot on the side of the road are located on the map. In addition, the accuracy of identifying the parking area can be improved by aligning the locations of vehicles at the entrances/exits.

In the above embodiment, vehicles identify off-road travel and transmit off-road travel trajectories to the data center 90 as parking-related data. Alternatively, off-road travel may be detected at the data center 90. The vehicles may transmit travel path data to the data center 90, and the data center 90 may detect off-road travel of each vehicle by matching the map data with the travel path data.

In the above embodiment, the process of aligning the locations and orientations of vehicles at entrances/exits is performed. In addition to this process, feature data, such as traffic signs, in a parking area may be used to align between parking-related data collected from a number of vehicles. Each vehicle detects features detected from images captured by the cameras 14-16 while traveling off a road and acquires data of directions in which the features can be seen. The parking-related data transmission unit 103 transmits data of the features and their locations to the data center 90 as parking-related data. The data center 90 can identify the locations of the features based on data from a large number of vehicles and may set a reference for superimposing travel trajectory data of the respective vehicles from data of the directions of the identified features.

In large shopping malls or the like, links including a parking lot attribute may be maintained as a navigation map, or parking lot polygons may be maintained. In such cases, the parking lot identification unit 93 may perform map matching using travel trajectories uploaded from the vehicles to identify and update entrances/exits, and parking lot areas.

Fifth Embodiment

A parking lot identification system according to a fifth embodiment will now be described. The parking lot identification system according to the fifth embodiment is similar in basic configuration to the parking lot identification system according to the first embodiment (see FIG. 1). In the above embodiments, examples of reflecting the identified parking lot area in the map data after the parking lot area has been identified has been described. The parking lot identification system of the fifth embodiment updates the map data when a predefined criterion is met.

Figure 15:
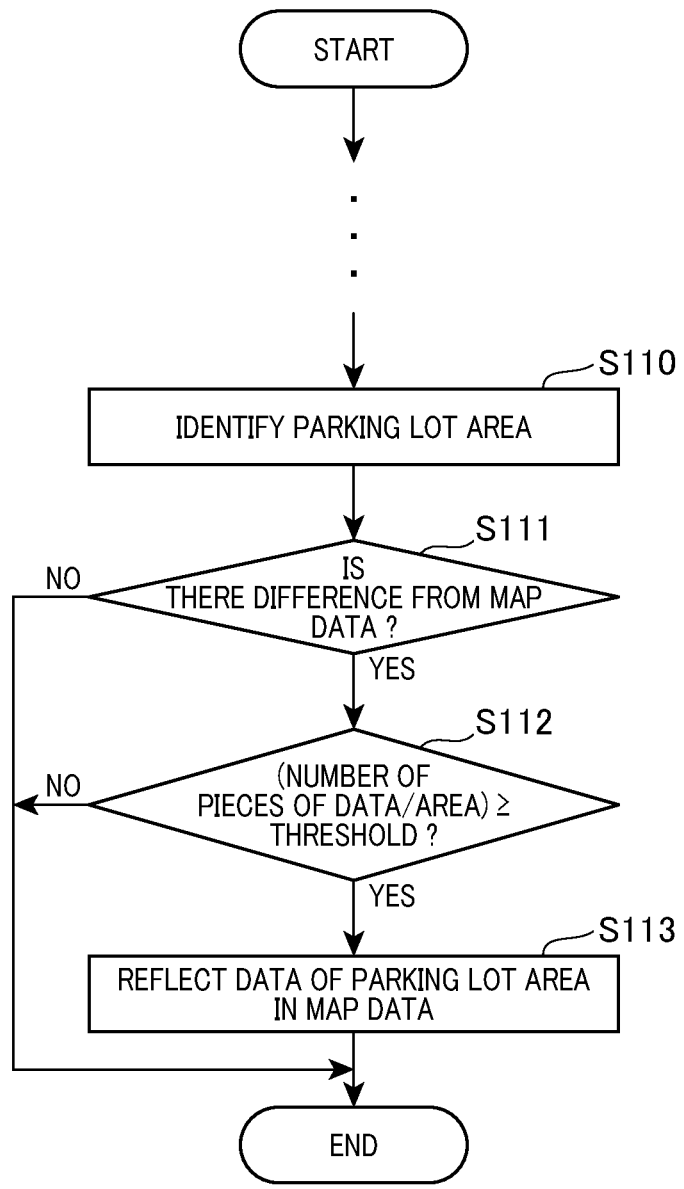
FIG. 15 is an illustration of updating data for an identified parking lot area.

FIG. 15 illustrates the operations in which the data center 90, after identifying a parking lot area based on parking-related data, reflects data of the identified parking lot area in the map data. Upon the parking lot identification unit 93 identifying a parking area (at S110), the parking lot identification unit 93 determines whether there is a difference between the identified parking area and the map data (at S111). If there is no difference between the identified parking area and the map data ("NO" branch of S111), the parking lot identification unit 93 does not update the map.

If there is a difference between the identified parking area and the map data ("YES" branch of S111), the parking lot identification unit 93 determines whether the number of pieces of data used to identify the map area divided by an area of the identified parking lot area is greater than or equal to a predefined threshold (at S112). The threshold used here may be set appropriately according to the type of facility attached to the parking lot (e.g., shopping mall, convenience store, etc.) and the dimensions of the parking lot.

Since the basic configuration of the parking lot identification system of the present embodiment is the same as that of the parking lot identification system of the first embodiment, the data used to identify the parking area is the data of locations and orientations of vehicles. If (the number of pieces of data/area) is greater than or equal to the predefined threshold ("YES" branch of S112), the parking lot identification unit 93 reflects the data of the parking lot area in the map data (at S113). If (the number of pieces of data/area) is less than the predefined threshold ("NO" branch of S112), the map data is not updated.

Determining the timing of updating data of a parking lot area in this manner allows the map data to be updated with reliable information. For example, if only the number of pieces of data is large but the parking lot area is large, the parking lot area may be deserted, and it may be difficult to accurately identify the parking lot area. For example, this is true when many people park a large number of vehicles near the entrance to a store during off-peak weekday hours and no vehicles are parked in areas far from the store. In this case, the parking area may be identified as smaller than it actually is. According to the present embodiment, the parking lot area may be properly identified because data under a condition that vehicles are parked at a given density is used.

In the fifth embodiment described above, the parking lot identification system similar in basic configuration to that of the first embodiment has been described. However, the method of determining the update timing described above may be applied to any one of the second through fourth embodiments. When applied to the parking lot identification system of the second embodiment, data used to determine the update timing is the number of pieces of travel path data used to identify the parking lot area.

Although the present embodiment provides an example of using the number of pieces of data divided by the area to determine whether to update the map data, another metric is conceivable. For example, the number of pieces of data divided by the number of parking slots may be used as a metric. The percentage of parking slots used may also be used as a metric. This is because if the parking lot is nearly full, it may be considered that the parking area may be accurately identified based on the parking locations of vehicles.

Although the present embodiment has been described for updating the map data to reflect the identified parking lot area, the map data, conversely, may also be updated when a parking lot area is no longer available or has been narrowed. For example, if the number of vehicles entering a parking lot area remains below a predefined threshold over a predefined period of time, it may be determined that the parking lot is no longer available. If there are vehicles entering a parking area but none of these vehicles are parked in a portion of the parking area over a predefined period of time, it may be determined that the portion of the parking area is no longer a parking lot area.

Sixth Embodiment

A parking lot identification system according to a sixth embodiment will now be described. The parking lot identification system of the sixth embodiment performs acceleration suppression control of vehicles in a parking lot area using the data of the parking lot area generated by the parking lot identification system of any one of the first through fifth embodiments. Here, the vehicle acceleration suppression control is a function referred to as the erroneous pushing-of-accelerator prevention function. The erroneous pushing-of-accelerator prevention function includes a type of speed suppression control. In the present embodiment, acceleration suppression control is used as an example. Alternatively, speed suppression control may also be performed. In the present embodiment, a vehicle having the overall ECU 30 installed will be described as a vehicle equipped with a driving assistance function.

The data center 90 downloads the map data reflecting the parking lot area to the overall ECU 30 of a vehicle, and the overall ECU 30 of the vehicle stores the downloaded map data in the map data storage unit 80. When the own vehicle is in the parking lot area, the overall ECU 30 limits the acceleration to a predefined threshold or lower to prevent accidents caused by erroneously pushing the accelerator. This may reduce the risk of colliding with a pedestrian or other object by erroneously pushing the accelerator in the parking lot. When the acceleration is limited at or below the predefined threshold, the HMI 50 may notify the driver that the erroneous pushing-of-accelerator prevention control is functioning or the vehicle is in an area where erroneous pushing-of-accelerator is prevented. The HMI 50 may notify the driver that the vehicle is in a parking lot area.

Figure 16:
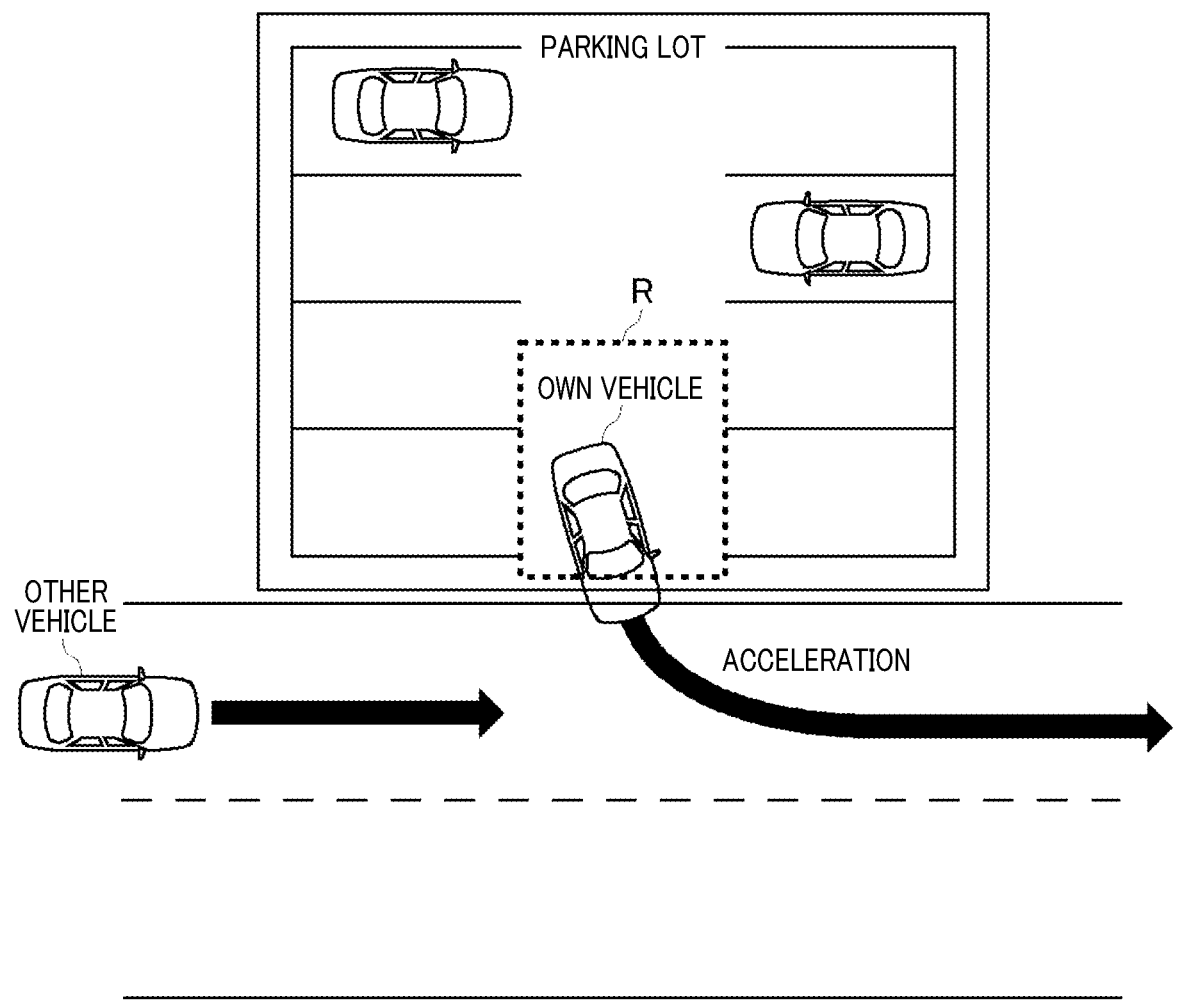
FIG. 16 is an illustration of a vehicle exiting a parking lot.

FIG. 16 illustrates a scene of a vehicle exiting a parking lot. In FIG. 16, the interior of the parking lot area is an acceleration suppression area. The overall ECU 30 determines whether the vehicle is inside the parking lot area, and in response to determining that the vehicle is inside the parking lot area, the overall ECU 30 controls the acceleration not to be higher than or equal to a predefined threshold.

In the present embodiment, instead of suppressing or deactivating acceleration as soon as the vehicle crosses the boundary between the parking lot area and the road, a region R connecting the parking lot and the road is provided near the entrance/exit of the parking lot area. A determination as to whether the vehicle has entered the region R is made by determining whether the vehicle is in the parking lot area and at a predefined distance from the outer edge of the parking lot area.

In a scene of a vehicle entering a parking lot, upon determining that the vehicle is within the region R, the overall ECU 30 applies relaxed acceleration suppression. In a scene of a vehicle exiting a parking lot, upon determining that the vehicle is within the region R, the overall ECU 30 deactivates the acceleration suppression. A scene determination as to whether the vehicle is entering or exiting may be made based on the direction of travel of the vehicle.

In the exiting scene, deactivating the acceleration suppression when the vehicle is in the region R allows the vehicle to smoothly exit onto the road, thereby reducing the risk of being rear-ended by a vehicle therebehind traveling on the road. In the entering scene, applying the relaxed acceleration suppression when the vehicle is in the region R allows the vehicle to enter the parking lot area smoothly while preventing the vehicle from erroneously pushing the accelerator in the parking lot area.

Preferably, the region R is large enough to encompass the vehicle. This is because at the beginning of driving, the accuracy of the sensors for detecting the current location of the vehicle may not be high. For example, positioning by GPS 25 may take time. Since positioning by the GPS 25 is not available in indoor parking lots, the current location of a vehicle is calculated by odometry of amounts of wheel rotation and steering angles from the last locations measured by the GPS. However, errors may accumulate and the high accuracy may not be achieved. Setting a larger region R may prevent inconveniences, such as acceleration limitations, even after the vehicle is on a road. In the present embodiment, an example of limiting acceleration to prevent erroneous pushing of the accelerator in a parking lot area has been described. Alternatively, the vehicle speed may be limited instead of the acceleration.

In the above embodiment, an example of determining whether the scene is an entering or exiting parking lot scene based on whether the parking lot area is located forward or backward of the vehicle has been described. In the scene determination, the average speed of vehicles traveling forward of the own vehicle is calculated from the images captured by the front camera sensor 14, and based on whether the average speed of other vehicles is greater than or equal to a predefined threshold, it may be determined whether the area forward of the own vehicle is a road. If the area forward of the own vehicle is a road, it may be determined that the own vehicle is going to exit the parking lot. If the area forward of the own vehicle is not a road, it may be determined that the own vehicle is going to enter the parking lot.

In the embodiment described above, an interface to deactivate the erroneous pushing-of-accelerator prevention function may be provided. For example, upon notification by the HMI 50 that the erroneous pushing-of-accelerator prevention function is installed in the area, a deactivation reception unit with an operation button or voice input that deactivates the erroneous pushing-of-accelerator prevention function through the driver's operation may be provided. It may be selectable whether to activate the erroneous pushing-of-accelerator prevention function through pre-setting.

In the embodiment described above, in the event where the driver erroneously pushes the accelerator and the acceleration control is actually activated, at least one of a location or parking lot area where the acceleration control was performed, the time (time stamp) when the acceleration control was performed, and map version information may be stored. The data may be stored in an on-board memory, such as the map data storage unit 80, or in a memory of the data center 90.

Specific embodiments for the parking lot identification system of the present disclosure have been described above in detail, but the parking lot identification system of the present disclosure is not limited to the above specific embodiments.

For example, landmark location data may be used as parking related data. For example, in a case where there is a characteristic sign or other landmark in a parking lot, the location of the sign is determined and location data of the sign (landmark) is transmitted to the data center 90 as parking-related data. This allows the data center 90 to integrate the parking slot location data transmitted from a number of vehicles using the landmark location data as reference.

In addition to the parking-related data described above, a parking completion flag indicating whether parking is automatic or manual parking, and data on the size or type of a vehicle may be used as parking-related data. Furthermore, the location and orientation of a parking slot may be determined by the overall ECU 30 mounted to the vehicle, where data of locations of the four corners of the parking slot or data of the center and orientation of the parking slot may be used as parking-related data.

Additional information to parking-related data may include the presence or absence of traffic signals at entrances/exits of parking lots, the presence or absence of gates, the presence or absence of sidewalks and widths of sidewalks if any, and data on stop lines near the entrances/exits. These items of data may be acquired by analysing images captured by the cameras 14-16. Having such information as additional information for parking lot areas may facilitate determination of whether the erroneous pushing-of-accelerator prevention function is on or off in a parking lot. Data on whether the parking lot is a multi-level parking lot may also be used. Whether the parking lot is a multi-level parking lot may be determined by analysing the images or from GPS data. In the case of a multi-level parking lot, it may be difficult to determine whether the vehicle is in an erroneous pushing-of-accelerator prevention area. Therefore, having data indicating that the parking lot is a multi-level parking lot allows for handling such as turning off the erroneous pushing-of-accelerator prevention function. In addition, data on the date and time of parking may be included as parking-related data. This may allow for appropriate determination of whether to update the map data.

In the above embodiments, examples have been described in which parking-related data is not acquired in a case where the parking location is on a road. In addition, in a case where the parking location is at home, parking-related data may not be acquired. This is because home parking lot areas do not need to be reflected in the map data.

For locations where the own vehicle is parked many times, a parking lot area may be identified based on travel history of the own vehicle. The locations where the own vehicle is parked many times are, for example, parking lots at home, at work, or at the family clinic. When the vehicle is parked, the parking location and slow-moving data before being parked or back data are stored in association with each other. Data with the same parking location is extracted and a parking area is identified based on the parking location and slow-moving data. In this case, processing may be performed only by the own vehicle without transmitting the data to the data center. That is, a parking lot area may be identified by the parking lot identification unit 41 of the overall ECU 30, and the identified parking lot area may be reflected in the map data by the map data processing unit 42. Identifying the parking area in this manner makes it possible to use the parking area data when parking a vehicle in a garage, and to park the vehicle appropriately while activating erroneous pushing-of-accelerator prevention control and other controls.

The parking lot identification system of the present disclosure is useful as a system for generating map data.

What is claimed is:

1. A parking lot identification system comprising a control apparatus mounted to each of a plurality of vehicles and a central apparatus that communicates with the control apparatus of each of the plurality of vehicles, wherein
   the control apparatus of each of the plurality of vehicles comprises;
      a parking determination unit configured to determine whether a parking action of the vehicle is recognized;
      a parking-related data acquisition unit configured to, in response to the parking action of the vehicle being recognized, acquire parking-related data including data of a location and an orientation of the vehicle during the parking action; and
      a parking-related data transmission unit configured to transmit the parking-related data to the central apparatus, and
   the central apparatus is configured to identify a parking lot area based on the parking-related data transmitted from the plurality of vehicles and reflect data of the identified parking lot area in map data.

2. The parking lot identification system according to claim 1, wherein
   the parking-related data acquisition unit is configured to acquire travel path data during a parking action as the parking-related data, the parking action being a driving action between a time of detection when turn off of an ignition key is detected based on data from an ignition sensor mounted to the vehicle and a certain time before the time of detection.

3. The parking lot identification system according to claim 1, wherein
   the parking-related data acquisition unit is configured to acquire travel path data during a parking action as the parking-related data, the parking action being a driving action between a location of the vehicle at a time of detection when turn off of an ignition key is detected based on data from an ignition sensor mounted to the vehicle and a location at a certain distance away from the location of the vehicle at the time of detection.

4. The parking lot identification system according to claim 1, wherein
   the parking determination unit is further configured to identify the parking action further using data from a vehicle speed sensor provided in the vehicle.

5. The parking lot identification system according to claim 1, wherein
   the parking determination unit is further configured to identify the parking action further using data from a shift position sensor provided in the vehicle.

6. The parking lot identification system according to claim 1, wherein
   the vehicle to which the control apparatus is mounted is a vehicle equipped with a parking assistance function, and
   the parking-related data acquisition unit is configured to, when automatic parking by the parking assistance function is recognized as the parking action, acquire travel path data during parking assistance as the parking-related data.

7. The parking lot identification system according to claim 1, wherein
   the parking-related data acquisition unit is configured not to acquire the parking-related data when a parking location of the vehicle is determined to be on a road based on map data read from a map data storage unit and location data of the vehicle.

8. The parking lot identification system according to claim 1, wherein
the parking-related data acquisition unit is configured not to transmit the parking-related data to the central apparatus when a parking location of the vehicle is determined to be on a road based on map data read from a map data storage unit and location data of the vehicle.

9. The parking lot identification system according to claim 1, wherein
the parking-related data acquisition unit is configured to determine a location and orientation of a parking slot based on images from a camera mounted to the vehicle or data from an object detection sensor mounted to the vehicle, and acquire data of the location and orientation of the parking slot as the parking-related data.

10. The parking lot identification system according to claim 1, wherein
the parking-related data acquisition unit is configured to acquire travel path data when the vehicle travels off a road as parking-related data, and
the central apparatus is configured to, based on the parking-related data transmitted from the plurality of vehicles, identify a point of deviation from the road as an entrance or exit of the parking lot.

11. The parking lot identification system according to claim 1, wherein
the parking-related data acquisition unit is configured to determine a location of a landmark based on images from a camera mounted to the vehicle and acquire data of the location of the landmark as the parking-related data.

12. The parking lot identification system according to claim 1, wherein
the parking-related data transmission unit is configured not to transmit the parking-related data to the central apparatus when the vehicle is known to be in a parking lot area according to map data read from a map data storage unit.

13. The parking lot identification system according to claim 1, wherein
the parking-related data transmission unit is configured to transmit the parking-related data during a power latch period after ignition is turned off or next time the vehicle is started.

14. The parking lot identification system according to claim 1, wherein
the central apparatus comprises a map data processing unit configured to update a map by reflecting data of the identified parking lot area on the map, and
the map data processing unit is further configured to determine when to update the map based on an amount of data used to identify the parking lot area and an area of the identified parking lot area.

15. The parking lot identification system according to claim 1, wherein
the control apparatus is configured to place a limit on an acceleration or speed to a predefined threshold or lower when the vehicle is in a parking lot area in the map data read from the map data storage unit.

16. The parking lot identification system according to claim 15, wherein
the control apparatus is configured to limit the acceleration or speed when the vehicle is located at a predefined distance from an outer edge of the parking lot area and the parking lot area is located forward of the vehicle.

17. The parking lot identification system according to claim 15, wherein
the control apparatus is configured to lift the limit on the acceleration or speed when the vehicle is located at a predefined distance from an outer edge of the parking lot area and the parking lot area is located backward of the vehicle.

18. The parking lot identification system according to claim 15, wherein
the control apparatus is configured to lift the limit on the acceleration or speed when the vehicle is located at a predefined distance from an outer edge of the parking lot area and an average speed of other vehicles traveling forward of the vehicle is greater or equal to a predefined threshold.

19. A method of a parking lot identification system identifying a parking lot, the parking lot identification system comprising a control apparatus mounted to each of a plurality of vehicles and a central apparatus that communicates with the control apparatus of each of the plurality of vehicles, the method comprising:
the control apparatus of each of the plurality of vehicles determining whether a parking action of the vehicle is recognized;
in response to the parking action of the vehicle being recognized, the control apparatus acquiring parking-related data, including data of a location and an orientation of the vehicle during the parking action;
the control apparatus transmitting the parking-related data to the central apparatus, and
the central apparatus identifying a parking lot area based on the parking-related data transmitted from the plurality of vehicles and reflecting data of the identified parking lot area in map data.

20. A control apparatus to be mounted to a vehicle, comprising:
a parking determination unit configured to determine whether a parking action of the vehicle is recognized;
a parking-related data acquisition unit configured to, in response to the parking action of the vehicle being recognized and a parking location of the vehicle not being on a road, acquire parking-related data, including data of a location and an orientation of the vehicle during the parking action;
a parking-related data transmission unit configured to, in response to the parking location of the vehicle not being within a known parking lot area, transmit the parking-related data to a central apparatus.

21. A central apparatus for identifying a parking lot area based on data collected from a plurality of vehicles, comprising:
a parking-related data reception unit configured to receive parking-related data transmitted from the plurality of vehicles, the parking-related data transmitted from each of the plurality of vehicles including data of a location and an orientation of the vehicle when parked;
a parking area identification unit configured to determine parking slots for vehicles based on the parking-related data and identifies a parking lot area based on a plurality of determined parking slots and reflect data of the identified parking lot area in map data.

22. A method of a central apparatus identifying a parking lot area based on data collected from a plurality of vehicles, the method comprising:

the central apparatus receiving parking-related data transmitted from the plurality of vehicles, the parking-related data transmitted from each of the plurality of vehicles including data of a location and an orientation of the vehicle when parked;

the central apparatus determining parking slots for vehicles based on the parking-related data and identifying the parking lot area based on a plurality of determined parking slots and reflecting data of the identified parking lot area in map data.

\* \* \* \* \*